United States Patent [19]

Whitcomb

[11] Patent Number: 5,036,619
[45] Date of Patent: Aug. 6, 1991

[54] CAPILLARY IRRIGATION SYSTEM

[76] Inventor: Carl E. Whitcomb, Rte. 5. Box 174, Stillwater, Okla. 74074

[21] Appl. No.: 518,175

[22] Filed: May 3, 1990

[51] Int. Cl.$^5$ ............................................. A01G 25/00
[52] U.S. Cl. ......................................... 47/79; 47/48.5
[58] Field of Search ................................... 47/79, 48.5

[56] References Cited

U.S. PATENT DOCUMENTS

| | | | |
|---|---|---|---|
| 2,003,986 | 6/1935 | Witthuhn | 47/39 |
| 2,198,309 | 4/1940 | James | 249/58 |
| 2,550,602 | 4/1951 | Rothe | 47/79 |
| 3,053,011 | 9/1962 | Silverman | 47/79 |
| 3,085,364 | 4/1963 | Chapin | 47/1 |
| 3,108,400 | 10/1963 | Wolfe, Jr. | 47/18 |
| 3,686,792 | 9/1972 | Barfield | 47/79 X |
| 3,783,555 | 1/1974 | Peters | 47/38 |
| 4,077,159 | 3/1978 | Haglund | 47/66 |
| 4,148,155 | 4/1979 | Allen | 47/79 X |
| 4,177,604 | 12/1979 | Friesen | 47/62 |
| 4,183,176 | 1/1980 | Barfield | 47/79 |
| 4,255,896 | 3/1981 | Carl | 47/62 |
| 4,347,687 | 9/1982 | Sibbel | 47/79 |
| 4,389,815 | 6/1983 | English et al. | 47/81 |
| 4,651,468 | 3/1987 | Martinez | 47/48.5 X |
| 4,729,189 | 3/1988 | Whitcomb | 47/39 |
| 4,887,388 | 12/1989 | Waltel | 47/79 |

FOREIGN PATENT DOCUMENTS

| | | | |
|---|---|---|---|
| 2623117 | 12/1977 | Fed. Rep. of Germany | 47/79 |
| 2645994 | 2/1978 | Fed. Rep. of Germany | 47/79 |
| 8027981 | 12/1980 | France . | |
| 2497059 | 7/1982 | France | 47/48.5 |
| 1245581 | 9/1967 | United Kingdom . | |

Primary Examiner—Richard E. Chilcot, Jr.
Assistant Examiner—Joanne C. Downs
Attorney, Agent, or Firm—Bill D. McCarthy; Glen M. Burdick

[57] ABSTRACT

An improved sub-irrigation system for container nursery stock wherein liquid rises by capillarity through small pores in the growth medium in the container so that the larger pores of the growth medium retain air. The sub-irrigation system comprises at least one container and a trough assembly. The container, which is constructed to receive and retain growth medium and one or more plants therein, is provided with a drain opening and a spatially disposed inlet port in a lower portion thereof; and the trough assembly is provided with an outwardly extending leg positionable through the inlet port of the container so that controlled amounts of liquid can be discharged into the growth medium for capillary movement therethrough and absorption by the roots of the plants in the container.

7 Claims, 1 Drawing Sheet

U.S. Patent      Aug. 6, 1991      5,036,619
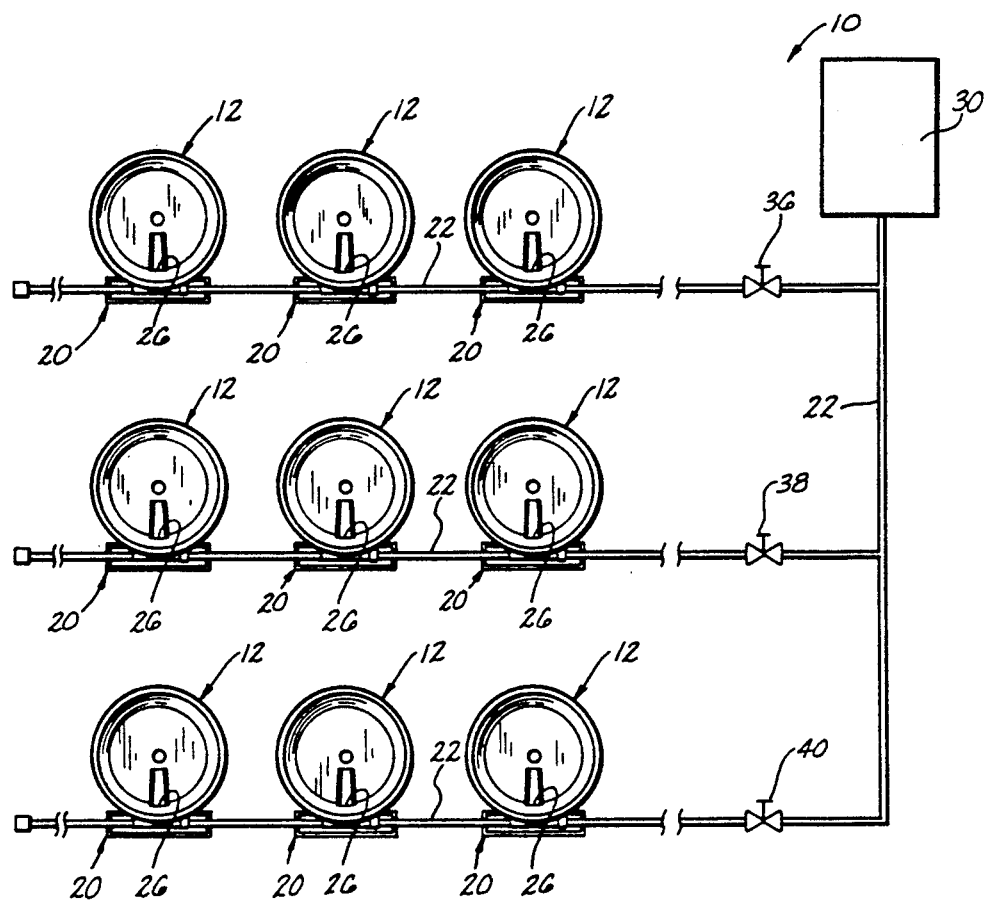
Fig. 1
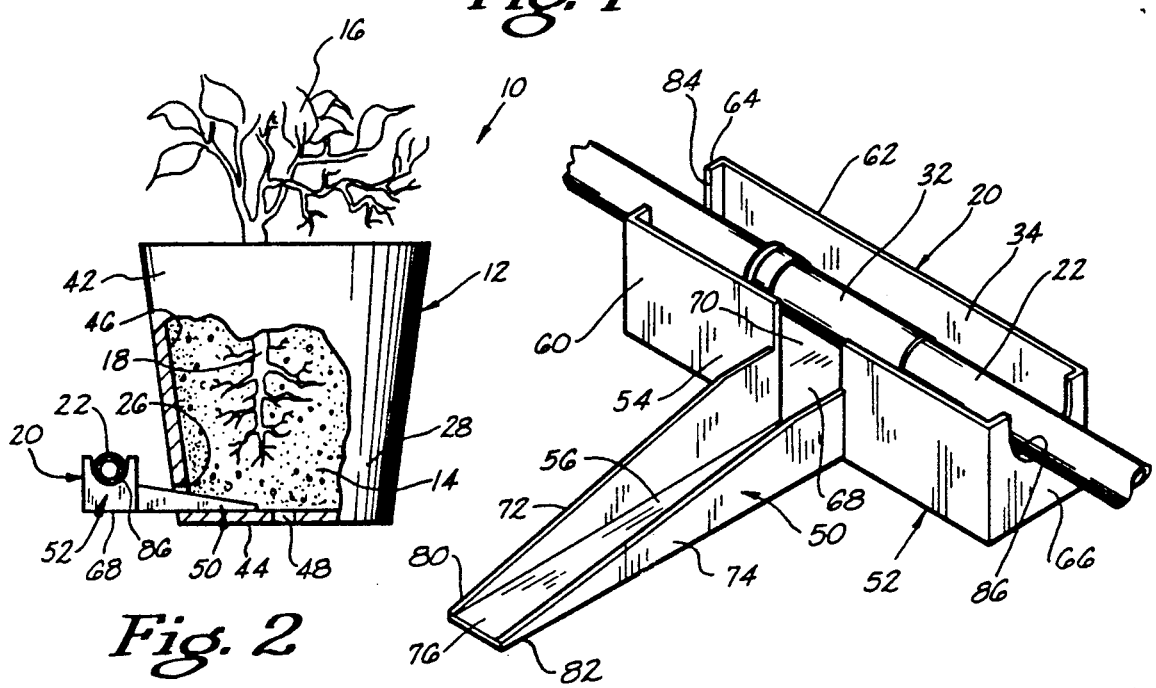
Fig. 2
Fig. 3

CAPILLARY IRRIGATION SYSTEM

BACKGROUND OF THE INVENTION

1. Field of the Invention

This invention relates generally to plant irrigation systems and more particularly, but not by way of limitation, to a system for irrigating container nursery stock by capillary action.

2. Brief Discussion of the Prior Art

Overhead sprinkler systems have heretofore been employed in nurseries to provide the water required for good growth of container nursery stock. Unfortunately, about ninety percent of the water from an overhead sprinkler system is wasted; that is, the water does not reach the plants in the containers, but falls between the containers on aisles, walkways, or roads adjacent the container production area. In areas of winds and low humidity, up to about sixty percent of the water discharged by an overhead sprinkler system is lost to evaporation. Losses may be even greater with rapidly turning sprinklers that create very small water droplets, thus increasing the droplet surface area subject to evaporation.

To overcome the before-mentioned problems inherent with overhead sprinkler systems, a plurality of individual or "spaghetti" tubes have been employed to water container nursery stock. By watering only the growth medium (soil mix) in the container and not the foliage of the plant, many disease problems are reduced or eliminated and the volume of water required is substantially less than that required when employing an overhead sprinkler system since only the container volume is wetted. Attempts to use individual tubes to water container nursery stock out-of-doors, however, have generally been unsuccessful for several reasons.

A major problem incurred in the use of individual tubes to water container nursery stock is the tremendous gravitational effect inherent within the system, and thus the uneven watering of plants which often occurs. For example, a slope of only a few inches will change the water discharge among a group of tubes from about thirty to about sixty percent.

While the gravitational effect inherent in the use of individual tubes to water container nursery stock can be overcome when using such a system on level greenhouse benches, nursery beds are generally not level due to the need for good surface drainage during periods of heavy rain. In addition, unless the containers are large, the expense and vast number of individual tubes required becomes impractical.

In addition, rodents (e.g., rats, rabbits) and turtles repeatedly bite off, cut or displace the small watering tubes. Since there is no water visible during the irrigation process, if a tube is cut by a rodent or accidentally pulled from a container, the plant is generally lost due to drought before the problem is noticed.

Drip irrigation systems have progressed rapidly during recent years because drip irrigation systems overcome many of the deficiencies and defects prevalent in the overhead sprinkler watering system and in the use of individual or "spaghetti" tubes. A drip irrigation system generally reduces water flight and runoff by about seventy-five percent. However, the difference in the output of water from one emitter to another emitter of a drip irrigation system is a major problem prevalent in the use of the drip irrigation system. To overcome the problem, modern drip irrigation emitters are pressure-compensating. That is, the drip irrigation emitters release a similar quantity of water during a unit of time over a moderate range of water pressure.

Drip irrigation systems also suffer from the detection problem in that when a malfunction occurs, the plant is generally lost due to drought before the defect can be detected and repairs made. Another major problem in the use of a drip irrigation system is that of proper spacing of the emitters. If the plastic pipe is tied to the end containers or stakes at the end of rows when it is hot, upon cooling the containers will be moved or connections pulled apart. On the other hand, if the pipe is tied when it is cool, as it increases in length with heating, it may deflect off the tops of the container. In addition to the problem of maintaining the emitters of a drip irrigation system in the proper location, working among drip irrigation lines poses a problem similar to that encountered when using individual or "spaghetti" tubes to water container nursery stock.

Capillary or sub-irrigation beds have been used for many years in England, New Zealand, and elsewhere for watering nursery stock out-of-doors and, in recent years, for greenhouse container plant production. The basic principle of a capillary bed is the capillary rise of water through the growth medium (i.e., soil mix) due to adhesion and cohesion forces, that is, the attraction of water by various surfaces and small spaces (adhesion) and the attraction of water molecules to each other (cohesion). While the system has worked well on a small scale under the mild climatic conditions of New Zealand and England, capillary or sub-irrigation bed watering systems have shortcomings, which include:

(a) the cost of construction;
(b) the maintenance required, including the periodic replacement of the sand;
(c) transplant shock arising from roots which grow out of the drain holes of the container and into the sand;
(d) increased water loss from the surface of the sand and capillary bed (which can increase water usage to as much as the overhead sprinkler systems) when environmental conditions are appropriate (e.g., low humidity, wind and high temperatures);
(e) germination of weedseed and growth of weeds on the wet surface between the containers; and
(f) algae growth which can quickly become unsightly and limit the useful life of the sand.

Capillary mats, which function on a principle similar to that of capillary or sub-irrigation beds have also been used in the greenhouse and florist industry. In using a capillary mat to water container nursery stock, the entire mat, which is a continuous mat of fabric or foam rubber material, is wetted, much like the capillary or sub-irrigation beds, and water moves capillarily up and into the growth medium in containers placed on the mat. These mats, regardless of composition, are subject to the same shortcomings as the capillary beds described above.

One method for overcoming many of the shortcomings of the before-described systems for watering container nursery stock is the sub-irrigation system disclosed in my U.S. Pat. No. 4,729,189. The sub-irrigation system comprises a thin, flexible sub-irrigation mat upon which containers sit to be irrigated through holes in the bottoms of the containers. Being thin and flexible and having the container sit on the mat, the irrigation outlets defined in the mat remain properly positioned under the containers.

The sub-irrigation mat is also provided with a plurality of cup members upon which the containers sit. Each of the cup members is connected to a channel member adjacent a hole so that water or other irrigating fluids flowing through the hole flows into the interior of the cup member. For example, a collapsible cup device defining the cup member can be positioned at the point where the appropriate center of a container is to be positioned when the container has a center watering hole in its bottom. The size of the collapsible cup device allows for some inaccuracies in placing the container over the respective outlet of the system. The cup also provides a seal with the bottom of the container.

While the sub-irrigation mat disclosed in U.S. Pat. No. 4,729,189 overcomes many of the disadvantages of the prior art watering systems employing capillary mats, capillary beds, drip irrigators, individual or "spaghetti" tubes, as well as overhead sprinklers, the need remains for an improved watering system, particularly a sub-irrigation system, which (a) is simple in construction and operation; (b) is not affected by the wind; and (c) effectively utilizes water in the watering of container nursery stock such that the foliage of such stock remains dry and thereby is less susceptible to disease, while at the same time insuring adequate root growth and substantially reducing root rot diseases which often occur in such container nursery stock. Further, it would be highly desirable if such a watering system would permit one to use capillary action to water the plant while reducing or eliminating algae problems, a problem prevalent with a capillary mat system. It is to such a sub-irrigation system that the present invention is directed.

SUMMARY OF THE INVENTION

The present invention provides an improved sub-irrigation system adapted to supply liquids to container nursery stock, wherein the liquid rises by capillarity through small pores in the growth medium in the container. By employing capillary action, the larger pores of the growth medium retain air so that the plant is provided with a combination of oxygen and liquid, a combination which enhances plant growth. Broadly, the sub-irrigation system of the present invention comprises at least one container and a trough assembly. The container, which is constructed to receive and retain growth medium and one or more plants therein, is provided with at least one drain opening and a spatially disposed inlet port in a lower portion thereof. The trough assembly is provided with an outwardly extending leg having an elongated passageway. The outwardly extending leg is positionable through the inlet port of the container so that controlled amounts of liquid can be discharged into the growth medium supported within the container for capillary movement therethrough and absorption by roots of the plants in the container.

The trough assembly comprises, in addition to the outwardly extending leg, a liquid-receiving receptacle member. The liquid-receiving receptacle member is provided with a cavity which openly communicates with the passageway of the outwardly extending leg; and the liquid-receiving receptacle member supportingly engages a liquid supply conduit having a calibrated drip irrigation emitter such that the calibrated drip irrigation emitter extends longitudinally along a medial portion of the liquid-receiving receptacle member. Thus, liquid gravitationally discharged from the calibrated drip irrigation emitter is directed into the cavity of the liquid-receiving receptacle member for discharge into the growth medium in the container, via the passageway of the outwardly extending leg. Because of the controlled gravitational feed of liquid to the growth medium via the calibrated irrigation emitter and the trough assembly, the liquid capillarily moves through a portion of the pores formed in the growth medium in the container to the roots of the plants. The capillary movement of controlled amounts of liquid through the growth medium enables a portion of the pores in the growth medium to retain air so that a suitable growth environment consisting of the growth medium and a mixture of air and liquid is available to the roots of the plants for enhancing growth of the plants.

An object of the present invention is to provide an improved irrigation system for container nursery stock wherein roots of plants can be effectively watered while maintaining an adequate amount of air in the growth medium to enhance plant growth.

Another object of the present invention, while achieving the before-stated object, is to provide an improved subirrigation system for container nursery stock wherein roots of plants supported in a growth medium can be effectively fed and watered via capillary movement of liquid through a portion of the pores defined in the growth medium.

Another object of the present invention, while achieving the before-stated object, is to provide an improved irrigation system adapted to insure the health of container nursery stock by reducing foliage diseases as well as minimizing germination of weed seeds in the growth medium.

Yet another object of the present invention, while achieving the before-stated objects, is to provide an improved sub-irrigation system for container nursery stock which is economical to manufacture, easy to use, and which overcomes the deficiencies of prior art watering systems.

Other objects, features and advantages of the present invention will be apparent from the following detailed description when read in conjunction with the drawings and appended claims.

BRIEF DESCRIPTION OF THE DRAWINGS

FIG. 1 is a plan view of a portion of a sub-irrigation system for nursery container stock constructed in accordance with the present invention wherein growth medium has been removed from containers to more clearly illustrate the interconnection of the containers to fluid delivery trough assemblies.

FIG. 2 is a side elevational view, partially in cross section, illustrating a sub-irrigation system of the present invention, wherein a container is substantially filled with a growth medium and a trough assembly is connected to the container.

FIG. 3 is a perspective view of a trough assembly of the sub-irrigation system of the present invention having a drip irrigation emitter supported thereon and in registry with the trough assembly.

DESCRIPTION OF THE PREFERRED EMBODIMENT

A sub-irrigation system 10 constructed in accordance with the present invention is shown in FIG. 1. The subirrigation system 10 comprises a plurality of containers 12, each of which is adapted to receive and retain growth medium 14 and one or more plants 16 therein as shown in FIG. 2. The growth medium 14 and the plants 16 constitute a growth environment. Thus, the sub-irrigation system 10, in cooperation with the growth medium 14, enables controlled amounts of liquid, such as water or liquid nourishment, to be delivered to roots 18 of the plants 16 by capillary movement of the liquid through a portion of the pores formed through the growth medium 14. Because the liquid is gravitationally fed into the growth medium 14, only the smaller pores in the growth medium 14 will be filled with the liquid via capillarity, leaving the larger pores in the growth medium to retain air. The capillary movement of the liquid through the growth medium 14 so as to permit both air and the liquid to be available to the roots 18 of the plants 16 provides an improvement over conventional watering and feeding techniques wherein both the large and small pores formed in the growth medium 14 are often filled with liquid and air is thus displaced therefrom.

The sub-irrigation system 10 further comprises a trough assembly 20 adapted to supportingly engage a liquid supply conduit 22 such that liquid can be controllably discharged from the liquid supply conduit 22 into the trough assembly 20 for gravitational movement into the growth medium 14 via an inlet port 26 formed in a lower portion 28 of each of the containers 12. The liquid supply conduit 22 is connected to and in fluid communication with a liquid supply source, such as a liquid holding tank 30. A plurality of calibrated drip emitters, such as drip emitter 32, are disposed within the liquid supply conduit 22 such that each of the calibrated drip emitters is positioned above and in registry with a trough cavity formed in each of the trough assemblies 20, such as trough cavity 34 illustrated in FIG. 3.

Valves, such as valves 36, 38 and 40, can be positioned in the liquid supply conduit 22 upstream of each bank of the containers 12 so that the flow of liquid through the liquid supply conduit 22 and into the containers 12 of each bank of the containers 12 can be controlled. That is, if the sub-irrigation system is employed on a plurality of banks of the containers 12, the valve 36 in one bank can be opened so that liquid flow is permitted therethrough while liquid flow to the remaining banks of the containers 12 can be prevented by closing the valves 38 and 40.

Referring now to FIGS. 2 and 3, one of the containers 12 is illustrated having a growth environment supported therein; that is, the growth medium 14 and one or more plants 16 are supported within the container 12. The roots 18 of the plants 16 are embedded and supported in the growth medium 14 in a customary manner. The container 12 is depicted as an inverted, substantially frusto-conical shaped member having a side wall 42 and a horizontally disposed bottom wall 44 defining a growth medium receiving cavity 46. A vertical drainage hole 48 is centrally located in the bottom wall 44 of the container 12, and side drainage holes (not shown) can also be formed in the lower portion 28 of the container 12 so as to extend through the side wall 42 and into fluid communication with the cavity 46 as known in the art. When providing side drainage holes in the side wall 42 of the container 12, the side drainage holes will be spatially disposed relative to the inlet port 26 formed in the lower portion 28 of the container 12.

It should be understood that the container 12 of the sub-irrigation system of the present invention can have any desirable configuration and as such the container 12 is not to be limited to the inverted, substantially frusto-conical shape depicted in the drawings. However, especially desirable results have been obtained when employing a container having an inverted frusto-conical shaped configuration in that the upwardly extending portion of the container 12 functions to protect the trough assembly 20 and thus the liquid supply conduit 22. That is, when the trough assembly 20 and the liquid supply conduit 22 are disposed substantially adjacent the lower portion of each of the containers, such as the lower portion 28 of the containers 12, the upwardly extending lip portion of the container 12 protrudes outwardly over at least a portion of the trough assembly 20 and thus the liquid supply conduit 22 so as to protect same from inadvertent damage or entanglement by an employee walking between banks of the containers.

Referring more specifically to FIG. 2, the trough assembly 20 is provided with an outwardly extending leg 50 positionable through the inlet port 26 of the container 12 so that controlled amounts of liquid can be discharged into the growth medium 14 supported within the container 12 for capillary movement therethrough and absorption by the roots 18 of the plants 16. The trough assembly 20 comprises, in addition to the outwardly extending leg 50, a liquid-receiving receptacle member 52. The liquid-receiving receptacle member 52 supportingly engages the liquid supply conduit 22 so that the calibrated drip irrigation emitter 32 extends longitudinally across a medial portion 54 of the liquid-receiving receptacle member 52.

The outwardly extending leg 50 is a substantially wedge-shaped member having a substantially U-shaped cross section configuration. Thus the outwardly extending leg 50 is provided with an open upper side and defines an elongated passageway 56 which openly communicates with the trough cavity 34 of the liquid-receiving receptacle member 52. The wedge-shaped configuration of the outwardly extending leg 50 enhances the placement of the outwardly extending leg 50 through the inlet port 26 of the container 12; and the elongated passageway 56 permits the growth medium 14 to be disposed therein when the trough assembly 20 is connected to the container 12. Thus, as water or other liquid is gravitationally discharged from the calibrated drip irrigation emitter 32, the liquid is directed into the trough cavity 34 of the liquid-receiving receptacle member 52 and discharged therefrom via the passageway 56 of the outwardly extending leg 50 and into contact with the growth medium 14 in the container 12.

When the liquid is contacted with the growth medium 14 in the container 12, the liquid capillarily moves through the smaller pores formed in the growth medium 14 to the roots 18 of the plants 16. The capillary movement of the controlled amounts of liquid through the growth medium 14 enables a portion of the pores (e.g., the larger pores) in the growth medium to retain air so that a suitable mixture of air and liquid is available to the roots 18 of the plants 16 and thereby provide a suitable growth environment for enhancing growth of the plants.

Referring now to FIG. 3, the relationship between the trough assembly 20 and the calibrated drip irrigation emitter 32 is illustrated. It should be noted that the calibrated drip irrigation emitter 32 is of a flow-through design and is well known in the industry. Thus, a further description or details concerning the calibrated drip irrigation emitter 32 is not believed necessary in order to enable those skilled in the art to completely understand the present invention.

The calibrated drip irrigation emitter 32 is disposed within the liquid supply conduit 22 such that a calibrated drip irrigation emitter 32 is located within the conduit line 22 at a position where a container 12 is placed which is to be provided liquid, such as water, through the trough assembly 20. Further, the calibrated drip irrigation emitter 32 is provided with a length less than the length of the liquid-receiving receptacle member 52 of the trough assembly 20; and the drip irrigation emitter 32 is substantially horizontally disposed relative to the medial portion 54 of the liquid-receiving receptacle member 52. Because the drip irrigation emitter 32 is provided with a length less than the length of the liquid-receiving receptacle member 52, any lateral movement caused by thermal expansion or contraction of the liquid supply conduit 22 will be insufficient to shift the drip irrigation emitter 32 out of registry with the liquid-receiving receptacle member 52. Further, it should be noted that because of the positioning of each of the trough assemblies 20 relative to each of the containers 12 of the sub-irrigation system 10, thermal expansion and contraction of the liquid supply conduits 22 are minimized because the liquid supply conduits 22 are disposed at ground level and as such are shaded by the containers 12 as well as the plants 16 growing therein.

The liquid-receiving receptacle 52 comprises a first side wall 60, a spatially disposed second side wall 62, a first end wall 64, a second end wall 66 and a base or bottom wall 68, each of which is connected to the adjacently disposed member so as to define the trough cavity 34. The first side wall 60 is provided with a substantially centrally disposed opening 70 which extends to the bottom wall 68. The opening 70 is aligned with and communicates with the elongated passageway 56 of the outwardly extending leg 50 so that liquid discharged into the trough cavity 34 of the liquid-receiving receptacle 52 is directed therefrom via the opening 70 and into contact with growth medium 14 in the passageway 56.

The outwardly extending leg 50 comprises a first side 72, a spatially disposed second side 74 and a bottom or base 76, all of which define the elongated passageway 56. The first and second sides 72, 74 are tapered in the direction of their respective distal ends 80, 82 so as to provide the outwardly extending leg 50 with its wedge-shaped configuration which enhances the positioning of the outwardly extending leg 50 into the inlet port 26 of the container 12. Thus, as previously stated, liquid discharged from the calibrated drip emitter 32 into the trough cavity 34 is discharged into the growth medium 14 via the outwardly extending leg 50 such that the liquid can be capillarily transported through the smaller pores formed in the growth medium 14 to the roots 18 of the plants 16 in the container 12.

To stabilize the liquid supply conduit 22 on the liquid-receiving receptacle 52 of the trough assembly 20 so that the calibrated drip emitter 32 is maintained in registry with the trough cavity 34 (even when slight variations of movement occur due to thermal expansion or contraction of the liquid supply conduit), the first and second end walls 64, 66 of the liquid-receiving receptacle 52 are provided with aligned recesses 84, 86 in an upper portion thereof substantially as shown. Thus, when the liquid supply conduit 22 is supportingly positioned within the recesses 84, 86 of the first and second end walls 64, 66, the calibrated drip emitter 32 is disposed above the medial portion 54 of the liquid-receiving receptacle 52 and in register with the trough cavity 34 substantially as shown. Further, the bottom wall 68 of the liquid-receiving receptacle 52 and the bottom 76 of the outwardly extending leg 50 are coplanar and the opening 70 extends through the first side wall 60 of the liquid-receiving receptacle 52 such that the passageway 56 of the outwardly extending leg 50 and the trough cavity 34 of the liquid-receiving receptacle 52 are in unrestricted liquid communication with each other to assist in the flow of water or other liquid from the liquid-receiving receptacle 52 into the growth medium 14 of the container 12.

In operation of the sub-irrigation system 10 of the present invention, the outwardly extending leg 50 of the trough assembly 20 is inserted through the inlet port 26 of the container 12 so that growth medium 14 is disposed within and substantially fills the passageway 56 of the outwardly extending leg 50. Thereafter, liquid supply conduits 22 are positioned along the banks of containers 12 such that a calibrated drip emitter 32 is disposed above and in registry with the trough cavity 34 of each of the liquid-receiving receptacles 52. Assuming that each bank of containers 12 is to be provided with liquid, valves 36, 38 and 40 are opened so that liquid is supplied to the drip emitters 32 in each bank of liquid supply conduits 22. Liquid discharged from the calibrated drip emitters 32 is directed into the trough cavity 34 of each of the liquid-receiving receptacles 52; and the liquid deposited therein is directed into the growth medium 14 in the containers 12 via the opening 70 formed in the first side wall 60 of the liquid-receiving receptacle 52 and the passageway 56 of the outwardly extending leg portion 50. Thus, liquid contacts the growth medium 14 in the passageway 56 of the outwardly extending leg 50 and rises through the growth medium 14 by capillary action so that it can be absorbed by the roots 18 of the plants 16. By controlling the rate of liquid input into the containers 12 in accordance with the demand of the roots 18 of the plants 16 (which changes as the plants mature), the top surface of the growth medium 14 remains dry, as does the foliage of the plants 16.

When employing the sub-irrigation system 10 to water container nursery stock, algae problems in the growth medium as well as foliage diseases are significantly reduced or eliminated. Further, because the top surface of the growth medium 14 is substantially dry, germination of weeds in the growth medium is substantially reduced and/or eliminated.

When it is determined desirable to transport the container nursery stock after the plants 16 in the containers 12 have matured to a predetermined size, the outwardly extending leg 50 of the trough assembly 20 is withdrawn from the inlet port 26 of each of the containers 12. Once removed, the container nursery stock can be transported to another location, such as a retail nursery. If desired, the sub-irrigation system 10 can again be employed at the retail nursery to enhance the health and maturity of the container nursery stock using the same procedures as set forth above.

It becomes apparent that the unique sub-irrigation system of the present invention offers many advantages over the prior art systems for watering and feeding container nursery stock. Further, because no pressure is required for delivering the liquid to the roots of the plants when employing the sub-irrigation system of the present invention, no channeling occurs in the growth medium which improves and enhances the growth environment. Further, it will be clear that the present invention is well adapted to carry out the objects and attain the advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims.

What is claimed is:

1. A sub-irrigation system comprising:
   at least one container adapted to receive and retain growth medium therein, the container having an inlet port in a lower portion thereof;
   trough means having an outwardly extending leg positionable through the inlet port for supplying liquid into the container and into contact with the growth medium so that the liquid capillarily travels through a portion of the pores in the growth medium and into contact with roots of a plant placed in the growth medium.

2. A sub-irrigation system of claim 1 wherein the container is provided with at least one drain opening in a lower portion thereof, and wherein the system further comprises conduit means operably connected to a liquid supply source for controllably discharging the liquid into the trough means.

3. A sub-irrigation system of claim 2 wherein the outwardly extending leg of the trough means is provided with a substantially U-shaped cross-sectional configuration so as to define an elongated passageway therein capable of receiving growth medium when the outwardly extending leg portion is positioned through the inlet port of the container, and wherein the trough means further comprises a liquid-receiving receptacle having a trough cavity, the liquid-receiving receptacle having an opening formed in one side thereof so that the trough cavity is in open communication with the elongated passageway of the outwardly extending leg and liquid discharged from the conduit means into the trough cavity is directed into contact with the growth medium by passage from the trough cavity into the elongated passageway.

4. A sub-irrigation system comprising:
   at least one container adapted to receive and retain growth medium therein, the container having an inlet port and at least one drain opening in a lower portion thereof;
   trough means having an outwardly extending leg positionable through the inlet port for supplying liquid into the container and into contact with the growth medium so that the liquid capillarily travels through a portion of the pores in the growth medium and into contact with roots of a plant placed in the growth medium, the outwardly extending leg having a substantially U-shaped cross-sectional configuration so as to define an elongated passageway therein capable of receiving growth medium when the outwardly extending leg is positioned through the inlet port of the container, the trough means further comprising:
   a liquid-receiving receptacle having spatially disposed end walls and a trough cavity, each of the end walls having a recessed portion in an upper portion thereof, the liquid-receiving receptacle having an opening formed in one side thereof so that the trough cavity is in open communication with the elongated passageway of the outwardly extending leg; and
   conduit means operably connected to a liquid supply source for controllably discharging liquid into the trough cavity of the liquid-receiving receptacle such that liquid discharged from the conduit means into the trough cavity is directed into contact with the growth medium by passage from the trough cavity into the elongated passageway of the outwardly extending leg portion, the conduit means comprising:
   a liquid supply conduit supported within the recessed portions in the opposed end walls of the liquid-receiving receptacle; and
   calibrated drip emitter means disposed within the liquid supply conduit in registry with the trough cavity for controllably discharging liquid passing through the liquid supply conduit into the trough cavity.

5. A sub-irrigation system of claim 4 wherein the conduit means further comprises valve means disposed within the liquid supply conduit for controlling fluid flow therethrough.

6. A device for sub-irrigation of roots of plants constituting container nursery stock wherein the container is substantially filled with growth medium and the container is provided with a fluid inlet port in a lower portion thereof, the device comprising trough means for supplying controlled amounts of liquid to the growth medium via the fluid inlet port of the container so the liquid capillarily travels through a portion of the pores formed through the growth medium to roots of the plant while permitting air to remain in a portion of the pores in the growth medium, the trough means comprising:
   a liquid-receiving receptacle having a trough cavity therein, the liquid-receiving receptacle characterized as having spatially disposed end walls, each of the end walls having a recessed portion formed in an upper portion thereof adapted to supportingly receive a liquid supply conduit; and
   a leg member connected to the liquid-receiving receptacle so as to extend outwardly therefrom, the leg member having a substantially U-shaped cross-sectional configuration and defining an elongated passageway, the elongated passageway openly communicating with the trough cavity of the liquid-receiving receptacle such that liquid discharged into the liquid-receiving receptacle is directed into contact with growth medium in the container by passage from the trough cavity into the elongated passageway of the leg member.

7. A device for sub-irrigation of roots of plants constituting container nursery stock wherein the container is substantially filled with growth medium and the container is provided with a fluid inlet port in a lower portion thereof, the device comprising trough means for supplying controlled amounts of liquid to the growth medium via the fluid inlet port of the container so that liquid capillarily travels through a portion of the pores formed through the growth medium to roots of the plant while permitting air to remain in a portion of the pores in the growth medium, the trough means comprising:
   a liquid-receiving receptacle having a trough cavity therein; and
   a leg member connected to the liquid-receiving receptacle so as to extend outwardly therefrom, the leg member positionable through the fluid inlet port of the container and defining an elongated passageway capable of receiving growth medium therein when the leg member is positioned through the inlet port of the container, the elongated passageway openly communicating with the trough cavity of the liquid-receiving receptacle such that liquid discharged into the trough cavity of the liquid-receiving receptacle is directed into contact with growth medium in the container by passage from the trough cavity into the elongated passageway of the leg member.

* * * * *